（12）United States Patent
Geirhofer et al.

(10) Patent No.: US 9,571,173 B2
(45) Date of Patent: Feb. 14, 2017

(54) ENFORCING CONSTANT MODULUS AND FINITE ALPHABET PROPERTIES IN ADAPTIVE AND DUAL-STAGE CODEBOOKS

(75) Inventors: Stefan Geirhofer, San Diego, CA (US); Peter Gaal, San Diego, CA (US); Juan Montojo, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 1207 days.

(21) Appl. No.: 13/210,052

(22) Filed: Aug. 15, 2011

(65) Prior Publication Data

US 2012/0039412 A1    Feb. 16, 2012

Related U.S. Application Data

(60) Provisional application No. 61/374,100, filed on Aug. 16, 2010.

(51) Int. Cl.
*H04B 7/02* (2006.01)
*H04B 7/04* (2006.01)
*H04B 7/06* (2006.01)

(52) U.S. Cl.
CPC .......... *H04B 7/0417* (2013.01); *H04B 7/0465* (2013.01); *H04B 7/0478* (2013.01); *H04B 7/065* (2013.01); *H04B 7/0634* (2013.01)

(58) Field of Classification Search
CPC ... H04B 7/0639; H04B 7/0478; H04B 7/0456; H04B 7/0626; H04B 7/0632; H04L 1/0026; H04L 25/03343; H04L 25/03898
(Continued)

(56) References Cited

U.S. PATENT DOCUMENTS

2008/0013610 A1   1/2008  Varadarajan et al.
2008/0285667 A1   11/2008 Mondal et al.
(Continued)

FOREIGN PATENT DOCUMENTS

JP    2008543215 A   11/2008
JP    2013529868 A   7/2013
(Continued)

OTHER PUBLICATIONS

Ericsson, ST-Ericsson, Refinements of Feedback and Codebook Design, Montreal, Canada, May 10-14, 2010, 3GPP TSG-RAN WG1, R1-103333, 12 pages.
(Continued)

*Primary Examiner* — Leila Malek
(74) *Attorney, Agent, or Firm* — Patterson & Sheridan, L.L.P.

(57) ABSTRACT

Methods and apparatus for enforcing codebook properties (e.g., constant modulus and/or finite alphabet) in adaptive and dual-stage codebooks are described. One example method generally includes receiving multiple feedback aspects of a channel for wireless communications determining multiple codewords based on the multiple feedback aspects, determining a final precoding matrix based on the multiple codewords, enforcing at least one codebook property in at least one of the multiple codewords or the final precoding matrix, applying the final precoding matrix to a plurality of spatial streams to form precoded spatial streams, and transmitting the precoded spatial streams. For certain aspects, enforcing the at least one codebook property includes quantizing elements in each of the multiple codewords and/or the final precoding matrix to the nearest value in a finite alphabet or to increase a performance metric.

60 Claims, 7 Drawing Sheets

(58) Field of Classification Search
USPC . 375/267, 295, 219, 299; 370/252; 455/101, 455/115.1, 69, 91
See application file for complete search history.

(56) References Cited

U.S. PATENT DOCUMENTS

| | | | |
|---|---|---|---|
| 2009/0003474 A1 | 1/2009 | Pan et al. | |
| 2009/0047999 A1* | 2/2009 | Xia et al. | 455/562.1 |
| 2009/0180405 A1* | 7/2009 | Ashikhmin et al. | 370/280 |
| 2010/0054212 A1 | 3/2010 | Tang | |
| 2010/0188966 A1* | 7/2010 | Pun et al. | 370/203 |
| 2010/0260243 A1 | 10/2010 | Ihm et al. | |
| 2010/0278278 A1 | 11/2010 | Lee et al. | |
| 2011/0243098 A1* | 10/2011 | Koivisto et al. | 370/335 |
| 2011/0319027 A1* | 12/2011 | Sayana et al. | 455/67.11 |
| 2013/0094464 A1 | 4/2013 | Li et al. | |

FOREIGN PATENT DOCUMENTS

| | | |
|---|---|---|
| JP | 2013535940 A | 9/2013 |
| WO | WO-2006129958 A1 | 12/2006 |
| WO | WO-2010076778 A1 | 7/2010 |
| WO | WO-2011160451 A1 | 12/2011 |

OTHER PUBLICATIONS

ZTE, Further Discussion on Two-component Feedback Framework for 8Tx, Dresden, Germany, Jun. 28-Jul. 2, 2010, 3GPP—TSG RAN WG1 Meeting #60bis, R1-103594, 14 pages.
Invitation to Pay Additional Fees for International Patent Application Serial No. PCT/US2011/047972, dated Oct. 25, 2011.
Ericsson, et al., "Way Forward for Rel-10 Feedback Framework," 3GPP R1-101683, Mar. 2010.
International Search Report and Written Opinion—PCT/US2011/047972—ISA/EPO—Dec. 5, 2011.
Ericsson., et al., "Design and Evaluation of Precoder Codebooks for CSI Feedback," 3GPP Draft; R1-103839, Precoder CB Design; 3rd Generation Partnership Project; Jun. 24, 2010, vol. RAN WG1, XP050449505, Mobile Competence Centre 650, F-06921 Sophia-Antipolis Cedex, France, Germany Jun. 28, 2010.
European Search Report—EP13185945—Search Authority—Munich—Mar. 5, 2014.
Philips., "CodeBook Alphabet and PA Power Balance," 3GPP Draft; R1-103909, 3rd Generation Partnership Project; Jun. 24, 2010, vol. RAN WG1, XP050449509, Mobile Competence Centre 650, F-06921 Sophia-Antipolis Cedex, France, Germany Jun. 28, 2010.

* cited by examiner

ENFORCING CONSTANT MODULUS AND FINITE ALPHABET PROPERTIES IN ADAPTIVE AND DUAL-STAGE CODEBOOKS

CROSS-REFERENCE TO RELATED APPLICATIONS

This application claims benefit of U.S. Provisional Patent Application Ser. No. 61/374,100, entitled "Enforcing Constant Modulus and Finite Alphabet Properties in Adaptive and Dual-Stage Codebooks" and filed Aug. 16, 2010, which is herein incorporated by reference.

BACKGROUND

I. Field

Certain aspects of the present disclosure generally relate to wireless communications and, more particularly, to methods and apparatus for enforcing codebook properties (e.g., constant modulus and/or finite alphabet) in adaptive and dual-stage codebooks.

II. Background

Wireless communication networks are widely deployed to provide various communication services such as voice, video, packet data, messaging, broadcast, etc. These wireless networks may be multiple-access networks capable of supporting multiple users by sharing the available network resources (e.g., bandwidth and transmit power). Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, $3^{rd}$ Generation Partnership Project (3GPP) Long Term Evolution (LTE) networks, and Long Term Evolution Advanced (LTE-A) networks.

A wireless communication network may include a number of base stations that can support communication with a number of user equipments (UEs). A UE may communicate with a base station via the downlink and uplink. The downlink (or forward link) refers to the communication link from the base station to the UE, and the uplink (or reverse link) refers to the communication link from the UE to the base station. A base station may transmit data and control information on the downlink to a UE and/or may receive data and control information on the uplink from the UE. This communication link may be established via a single-input single-output, multiple-input single-output or a multiple-input multiple-output (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

A MIMO system supports time division duplex (TDD) and frequency division duplex (FDD) systems. In a TDD system, the forward and reverse link transmissions are on the same frequency region so that the reciprocity principle allows the estimation of the forward link channel from the reverse link channel. This enables the base station to extract transmit beamforming gain on the forward link when multiple antennas are available at the base station.

SUMMARY

Certain aspects of the present disclosure generally relate to enforcing codebook properties (e.g., constant modulus and/or finite alphabet) in adaptive and dual-stage codebooks.

Certain aspects of the present disclosure provide a method for wireless communications. The method generally includes receiving multiple feedback aspects of a channel for the wireless communications; determining multiple codewords based on the multiple feedback aspects; determining a final precoding matrix based on the multiple codewords; enforcing at least one codebook property in at least one of the final precoding matrix or the multiple codewords; applying the final precoding matrix to a plurality of spatial streams to form precoded spatial streams; and transmitting the precoded spatial streams.

Certain aspects of the present disclosure provide an apparatus for wireless communications. The apparatus generally includes means for receiving multiple feedback aspects of a channel for the wireless communications; means for determining multiple codewords based on the multiple feedback aspects; means for determining a final precoding matrix based on the multiple codewords; means for enforcing at least one codebook property in at least one of the final precoding matrix or the multiple codewords; means for applying the final precoding matrix to a plurality of spatial streams to form precoded spatial streams; and means for transmitting the precoded spatial streams.

Certain aspects of the present disclosure provide an apparatus for wireless communications. The apparatus generally includes a receiver, a processing system, and a transmitter. The receiver is typically configured to receive multiple feedback aspects of a channel for the wireless communications. The processing system is generally configured to determine multiple codewords based on the multiple feedback aspects, determine a final precoding matrix based on the multiple codewords, to enforce at least one codebook property in at least one of the final precoding matrix or the multiple codewords, and to apply the final precoding matrix to a plurality of spatial streams to form precoded spatial streams. The transmitter is typically configured to transmit the precoded spatial streams.

Certain aspects of the present disclosure provide a computer-program product for wireless communications. The computer-program product generally includes a computer-readable medium, which typically includes code for receiving multiple feedback aspects of a channel for the wireless communications; determining multiple codewords based on the multiple feedback aspects; determining a final precoding matrix based on the multiple codewords; enforcing at least one codebook property in at least one of the final precoding matrix or the multiple codewords; applying the final precoding matrix to a plurality of spatial streams to form precoded spatial streams; and transmitting the precoded spatial streams.

Various aspects and features of the disclosure are described in further detail below.

DETAILED DESCRIPTION

Figure 1:
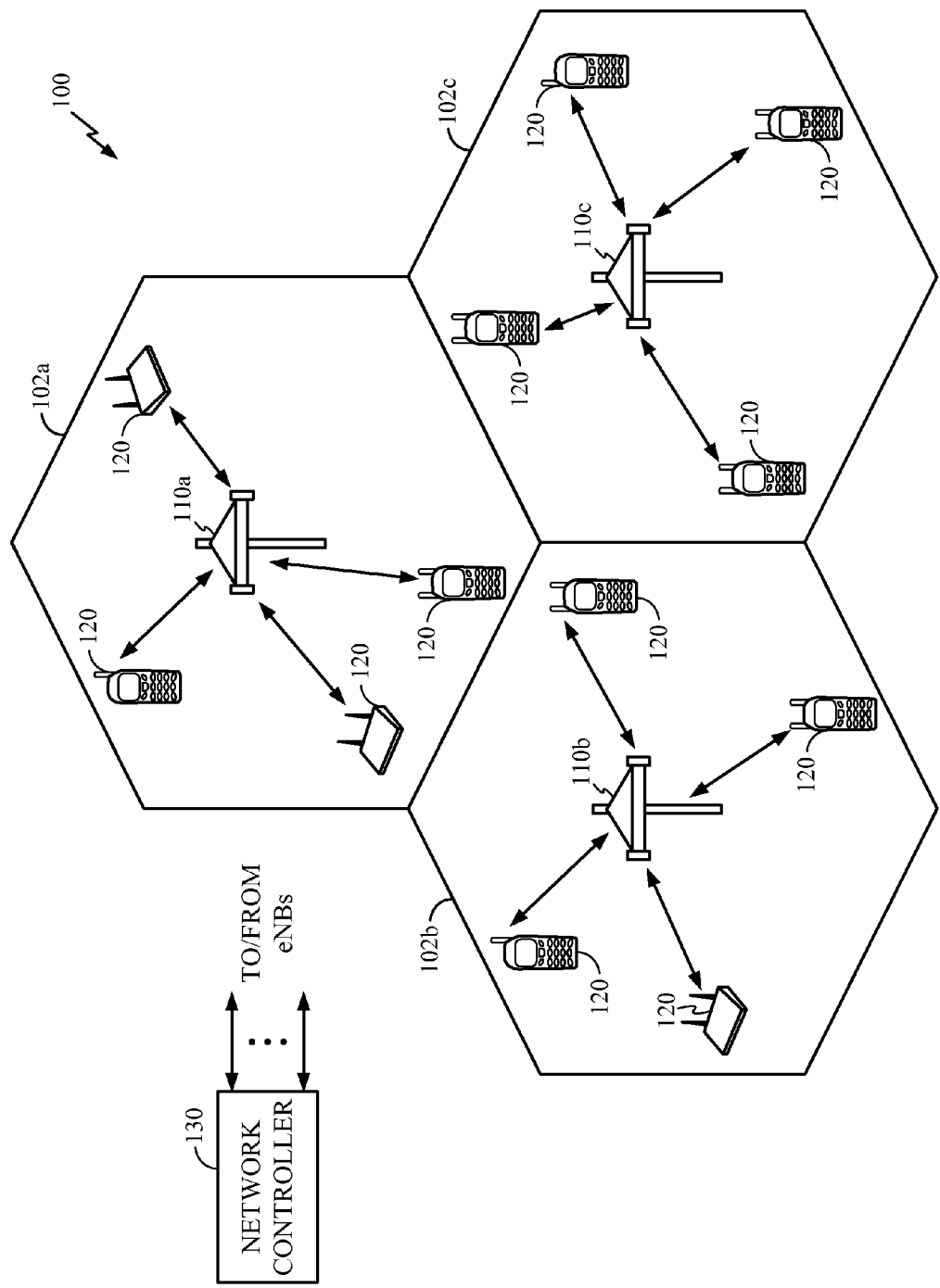
FIG. 1 is a block diagram conceptually illustrating an example of a wireless communications network in accordance with certain aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Single carrier frequency division multiple access (SC-FDMA) is a transmission technique that utilizes single carrier modulation at a transmitter side and frequency domain equalization at a receiver side. The SC-FDMA has similar performance and essentially the same overall complexity as those of OFDMA system. However, SC-FDMA signal has lower peak-to-average power ratio (PAPR) because of its inherent single carrier structure. The SC-FDMA has drawn great attention, especially in the uplink communications where lower PAPR greatly benefits the mobile terminal in terms of transmit power efficiency. It is currently a working assumption for uplink multiple access scheme in the 3GPP LTE, LTE-A, and the Evolved UTRA.

FIG. 1 shows an example wireless communication network 100, which may be an LTE network. Wireless network 100 may include a number of evolved Node Bs (eNBs) 110 and other network entities. An eNB may be a station that communicates with the user equipment devices (UEs), and may also be referred to as a base station, a Node B, an access point, etc. Each eNB 110 may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). An eNB for a macro cell may be referred to as a macro eNB. An eNB for a pico cell may be referred to as a pico eNB. An eNB for a femto cell may be referred to as a femto eNB or a home eNB. An eNB may support one or multiple (e.g., three) cells.

Wireless network 100 may also include relay stations. A relay station is a station that receives a transmission of data and/or other information from an upstream station (e.g., an eNB or a UE) and sends a transmission of the data and/or other information to a downstream station (e.g., a UE or an eNB). A relay station may also be a UE that relays transmissions for other UEs. A relay station may also be referred to as a relay eNB, a relay, etc.

Wireless network 100 may be a heterogeneous network that includes eNBs of different types, e.g., macro eNBs, pico eNBs, femto eNBs, relays, etc. These different types of eNBs may have different transmit power levels, different coverage areas, and different impact on interference in wireless network 100. For example, macro eNBs may have a high transmit power level (e.g., 20 watts) whereas pico eNBs, femto eNBs, and relays may have a lower transmit power level (e.g., 1 watt).

Wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for both synchronous and asynchronous operation.

A network controller 130 may couple to a set of eNBs and provide coordination and control for these eNBs. Network controller 130 may communicate with eNBs 110 via a backhaul. eNBs 110 may also communicate with one another, e.g., directly or indirectly via wireless or wireline backhaul.

UEs 120 may be dispersed throughout wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a tablet, etc. A UE may be able to communicate with macro eNBs, pico eNBs, femto eNBs, relays, etc. In FIG. 1, a solid line with double arrows indicates transmissions between a UE and a serving eNB, which is an eNB designated to serve the UE on the downlink and/or uplink.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz, and there may be 1, 2, 4, 8, or 16 subbands for system bandwidth of 1.25, 2.5, 5, 10, or 20 MHz, respectively.

Figure 2:
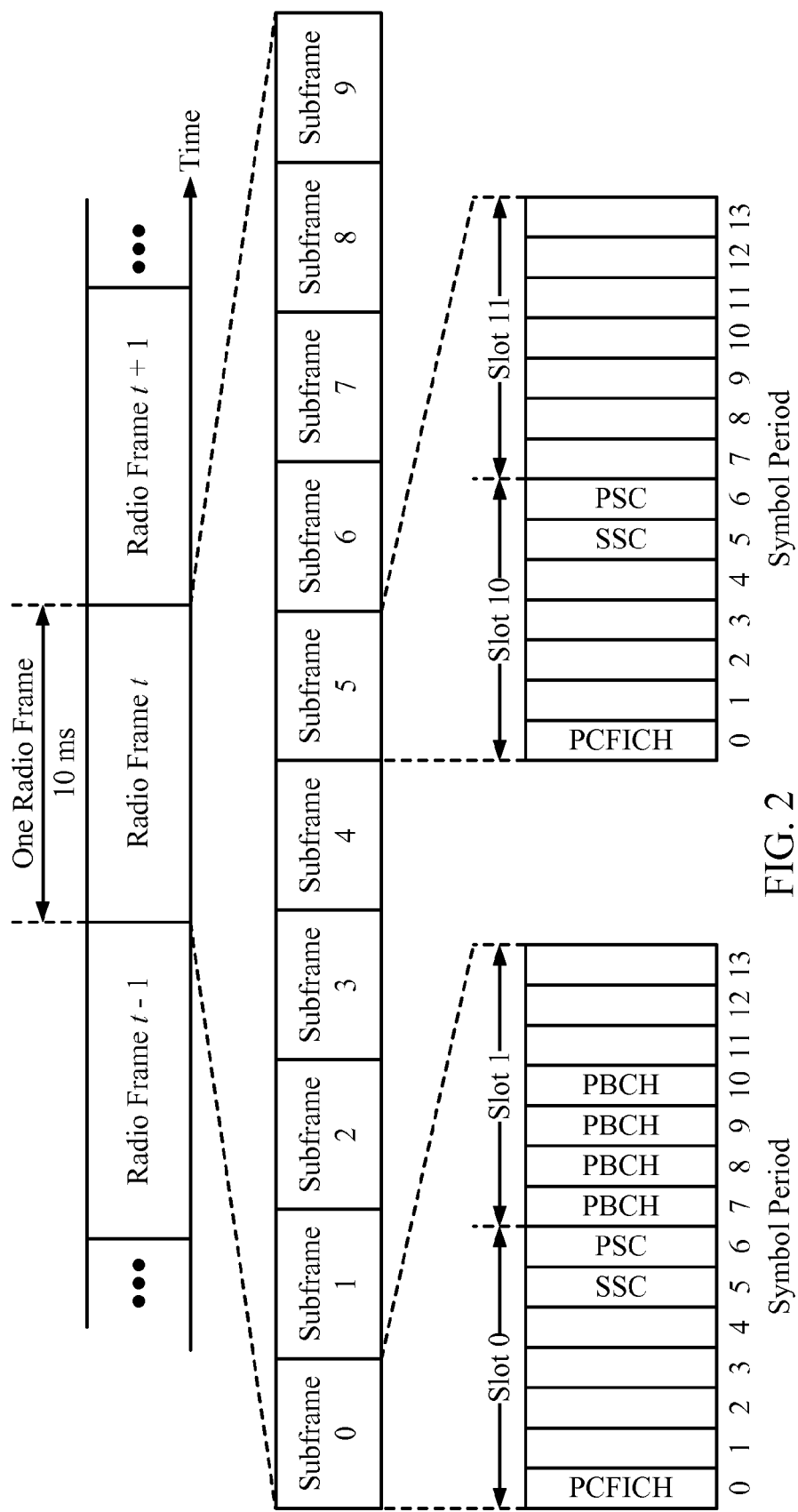
FIG. 2 is a block diagram conceptually illustrating an example of a frame structure in a wireless communications network in accordance with certain aspects of the present disclosure.

FIG. 2 shows a frame structure used in LTE. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., L=7 symbol periods for a normal cyclic prefix (as shown in FIG. 2) or L=6 symbol periods for an extended cyclic prefix. The 2L symbol periods in each subframe may be assigned indices of 0 through 2L-1. The available time frequency resources may be partitioned into resource blocks. Each resource block may cover N subcarriers (e.g., 12 subcarriers) in one slot.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in the first symbol period of each subframe, as shown in FIG. 2. The PCFICH may convey the number of symbol periods (M) used for control channels, where M may be equal to 1, 2, or 3 and may change from subframe to subframe. M may also be equal to 4 for a small system bandwidth, e.g., with less than 10 resource blocks. The eNB may send a Physical HARQ Indicator Channel (PHICH) and a Physical Downlink Control Channel (PDCCH) in the first M symbol periods of each subframe (not shown in FIG. 2). The PHICH may carry information to support hybrid automatic repeat request (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The eNB may send the PSS, SSS, and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH and PHICH in a broadcast manner to all UEs, may send the PDCCH in a unicast manner to specific UEs and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1, and 2. The PDCCH may occupy 9, 18, 32, or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

Figure 2A:
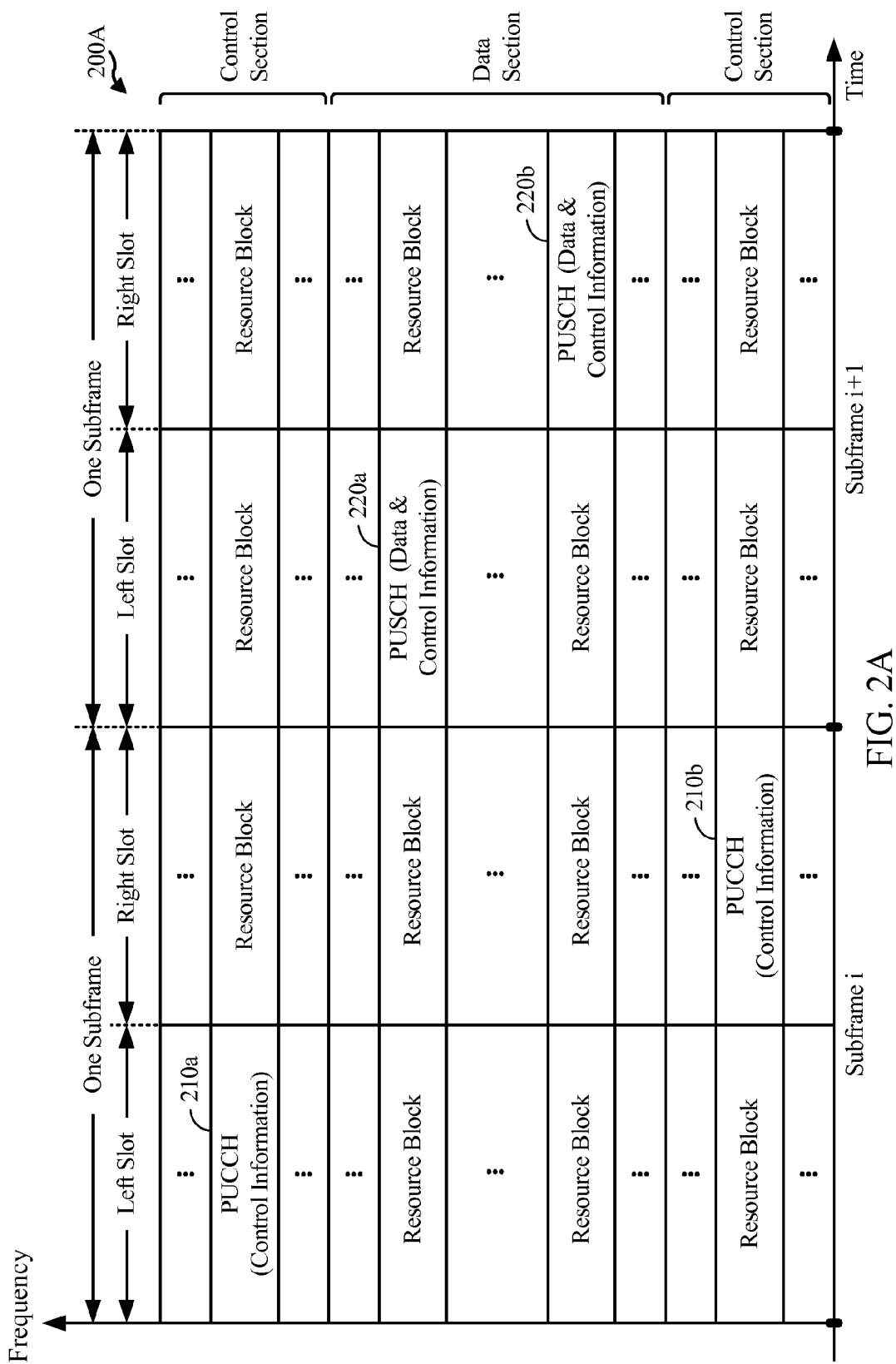
FIG. 2A shows an example format for the uplink in Long Term Evolution (LTE) in accordance with certain aspects of the present disclosure.

FIG. 2A shows an exemplary format 200A for the uplink in LTE. The available resource blocks for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 2A results in the data section including contiguous subcarriers, which may allow a single UE to be assigned all of the contiguous subcarriers in the data section.

A UE may be assigned resource blocks in the control section to transmit control information to an eNB. The UE may also be assigned resource blocks in the data section to transmit data to the Node B. The UE may transmit control information in a Physical Uplink Control Channel (PUCCH) 210a, 210b on the assigned resource blocks in the control section. The UE may transmit only data or both data and control information in a Physical Uplink Shared Channel (PUSCH) 220a, 220b on the assigned resource blocks in the data section. An uplink transmission may span both slots of a subframe and may hop across frequency as shown in FIG. 2A.

Figure 3:
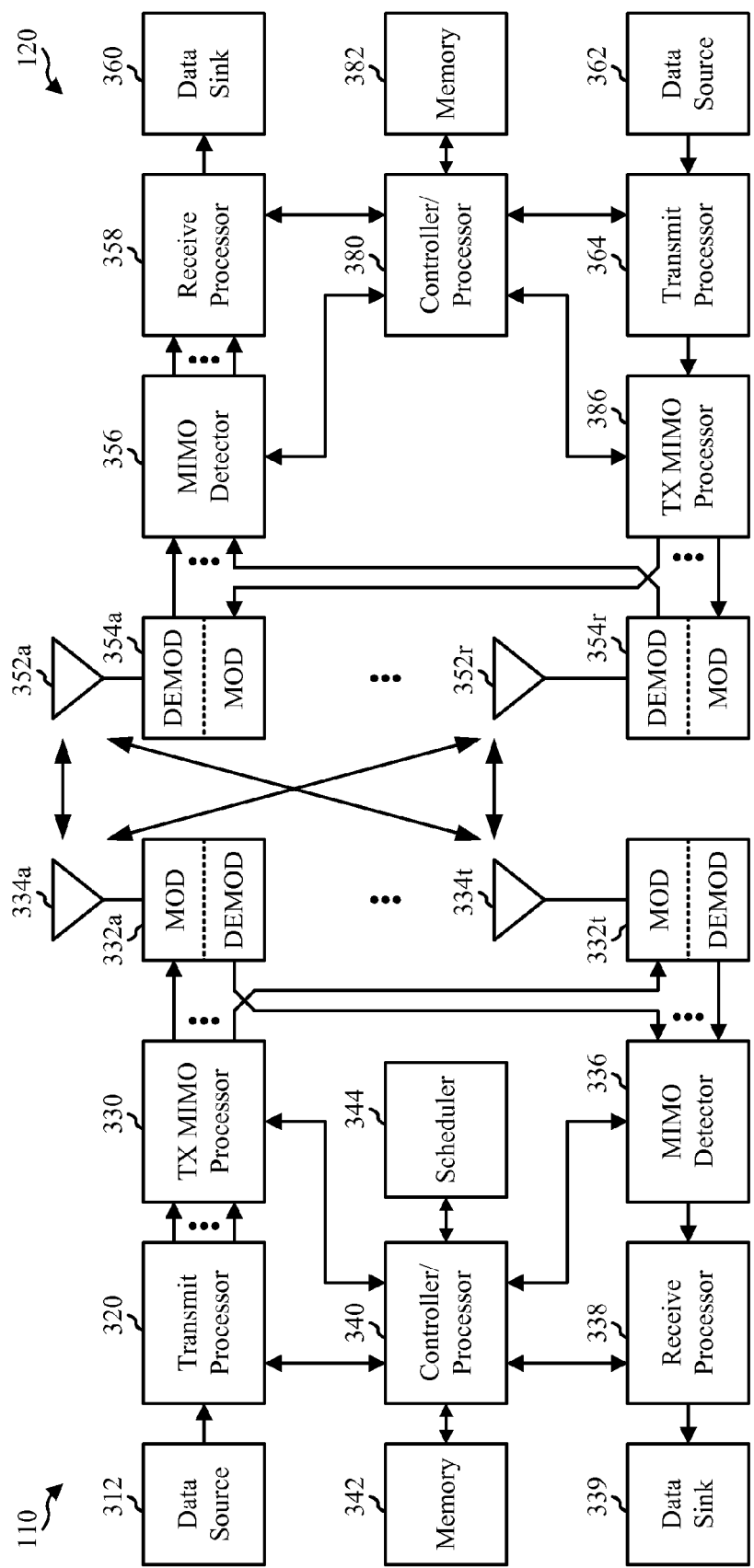
FIG. 3 shows a block diagram conceptually illustrating an example of a Node B in communication with a user equipment device (UE) in a wireless communications network in accordance with certain aspects of the present disclosure.

FIG. 3 shows a block diagram of a design of a base station (or an eNB 110) and a UE 120, which may be one of the base stations/eNBs and one of the UEs in FIG. 1. The eNB 110 may be equipped with T antennas 334a through 334t, and UE 120 may be equipped with R antennas 352a through 352r, where in general T≥1 and R≥1.

At the eNB 110, a transmit processor 320 may receive data from a data source 312 and control information from a controller/processor 340. The control information may be for the PBCH, PCFICH, PHICH, PDCCH, etc. The data may be for the PDSCH, etc. The transmit processor 320 may process (e.g., encode and symbol map) the data and control information to obtain data symbols and control symbols, respectively. The transmit processor 320 may also generate reference symbols, e.g., for the PSS, SSS, and cell-specific reference signal. A transmit (TX) multiple-input multiple-output (MIMO) processor 330 may perform spatial processing (e.g., precoding) on the data symbols, the control symbols, and/or the reference symbols, if applicable, and may provide T output symbol streams to T modulators (MODs) 332a through 332t. Each modulator 332 may process a respective output symbol stream (e.g., for OFDM, etc.) to obtain an output sample stream. Each modulator 332 may further process (e.g., convert to analog, amplify, filter, and upconvert) the output sample stream to obtain a downlink signal. T downlink signals from modulators 332a through 332t may be transmitted via T antennas 334a through 334t, respectively.

At UE 120, antennas 352a through 352r may receive the downlink signals from the eNB 110 and may provide received signals to demodulators (DEMODs) 354a through 354r, respectively. Each demodulator 354 may condition (e.g., filter, amplify, downconvert, and digitize) a respective received signal to obtain input samples. Each demodulator 354 may further process the input samples (e.g., for OFDM, etc.) to obtain received symbols. A MIMO detector 356 may obtain received symbols from all R demodulators 354a through 354r, perform MIMO detection on the received symbols, if applicable, and provide detected symbols. A receive processor 358 may process (e.g., demodulate, deinterleave, and decode) the detected symbols, provide decoded data for UE 120 to a data sink 360, and provide decoded control information to a controller/processor 380.

On the uplink, at UE 120, a transmit processor 364 may receive and process data (e.g., for the PUSCH) from a data source 362 and control information (e.g., for the PUCCH) from the controller/processor 380. The transmit processor 364 may also generate reference symbols for a reference signal. The symbols from the transmit processor 364 may be precoded by a TX MIMO processor 366 if applicable, further processed by modulators 354a through 354r (e.g., for SC-FDM, etc.), and transmitted to the eNB 110. At the eNB 110, the uplink signals from UE 120 may be received by antennas 334, processed by demodulators 332, detected by a MIMO detector 336 if applicable, and further processed by a receive processor 338 to obtain decoded data and control information sent by UE 120. The receive processor 338 may provide the decoded data to a data sink 339 and the decoded control information to the controller/processor 340.

Controllers/processors 340 and 380 may direct the operation at the eNB 110 and UE 120, respectively. Controller/processor 340, TX MIMO processor 330, receive processor 338, and/or other processors and modules at the eNB 110 may perform or direct operations 500 in FIG. 5 and/or other processes for the techniques described herein. At UE 120, controller/processor 380, TX MIMO processor 366, receive processor 358, and/or other processors and modules may perform or direct operations 500 in FIG. 5 and/or other processes for the techniques described herein. Memories 342 and 382 may store data and program codes for the eNB 110 and UE 120, respectively. A scheduler 344 may schedule UEs for data transmission on the downlink and/or uplink.

Enforcing Constant Modulus and Finite Alphabet Properties in Adaptive and Dual-Stage Codebooks For certain MIMO schemes, a transmitter maps streams of modulated symbols onto spatial streams (i.e., signals that are to be transmitted over different MIMO transmission channels). The spatial streams are also referred to as spatial layers, transmission layers, or simply data streams for brevity. The transmitter then applies a precoding operation to map each spatial stream onto a respective set of antenna ports. The precoding operation is typically expressed by a precoding matrix (W), which defines the linear combination of spatial streams that are mapped onto each antenna port. Some MIMO systems use a predefined set of precoding matrices, referred to as a codebook, which is known to the transmitter and the receiver.

Furthermore, some MIMO systems use feedback combined with precoding to improve the MIMO fading channel. In such systems, a receiver may estimate the MIMO channel between the transmitter's antennas and the receiver's antennas. The transmitter may then receive channel state information (CSI) or a channel quality indicator (CQI), transmitter rank selection information, and/or precoder selection information from the receiver. The transmitter uses the received feedback information to select a precoding matrix for a subsequent transmission.

Adaptive and dual-stage codebooks have recently received increasing attention in wireless communications as a means to increase feedback accuracy, spectral efficiency, and ultimately, system performance. In such approaches to codebook design, the CSI feedback is a function of multiple feedback components which can be designed to capture different aspects of the channel and are typically fed back with different time/frequency granularities.

Figure 4:
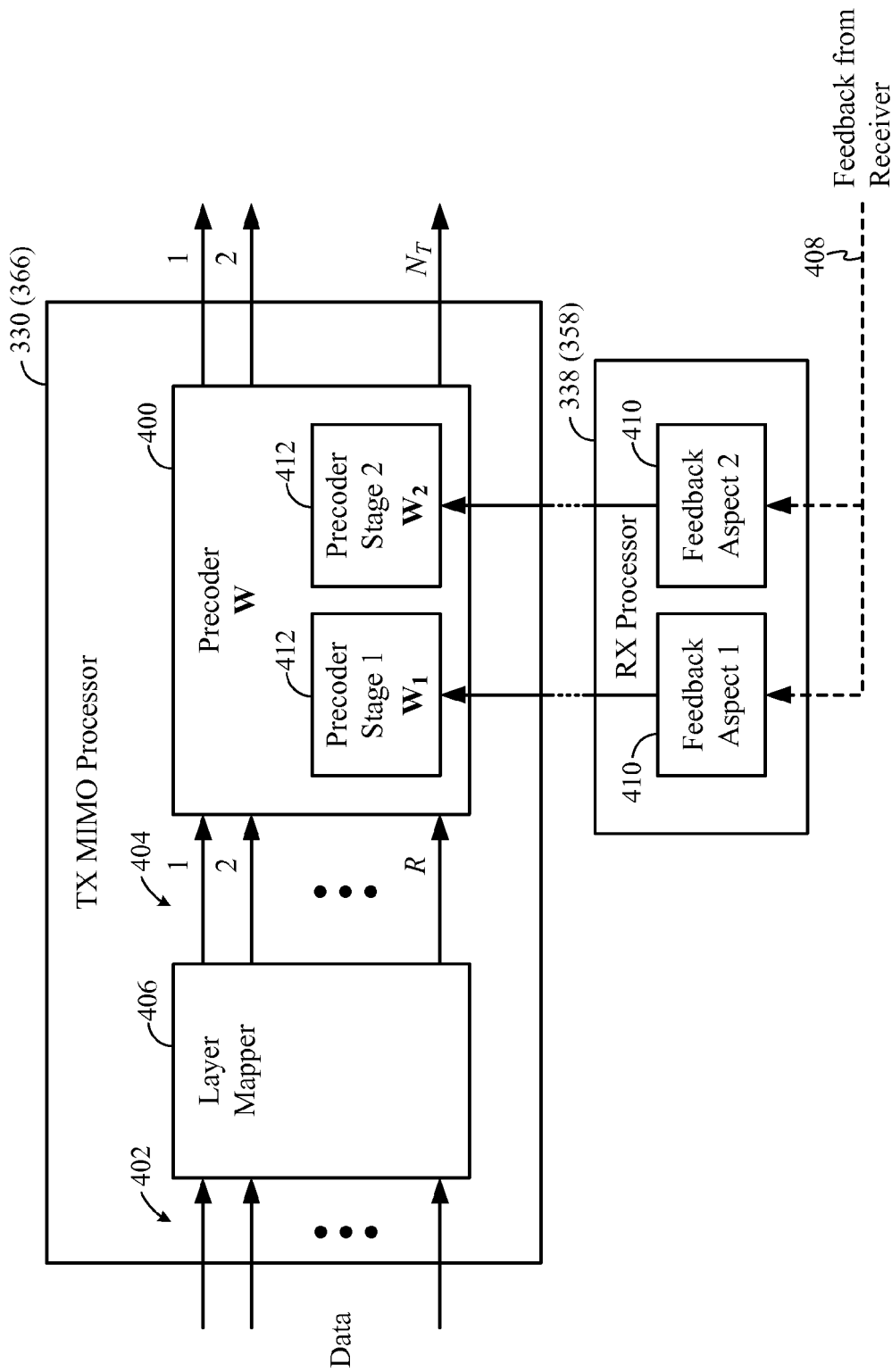
FIG. 4 illustrates an example precoder with a dual-stage codebook in accordance with certain aspects of the present disclosure.

FIG. 4 illustrates an example precoder 400 with a dual-stage codebook in accordance with certain aspects of the present disclosure. In FIG. 4, modulated symbols 402 may be mapped onto R spatial streams 404 by a layer mapper 406. The precoder 400 applies a final precoding matrix (W) to the R spatial streams 404 to map each spatial stream onto a respective set of antenna ports for further processing and transmission by the antennas.

The transmitter may receive feedback 408, which may include CSI, from a receiver. Multiple feedback aspects 410 of the feedback 408 may be determined by a processor, such as the receive processor 338 (358) of the eNB 110 (UE 120). For example, feedback aspect 1 may comprise wideband and/or long-term channel properties, while feedback aspect 2 may comprise frequency-selective (i.e., subband-specific) and/or short-term channel properties. The dual-stage precoder 400 may comprise two precoder stages 412, precoder stage 1 and precoder stage 2. Based on feedback aspect 1, precoder stage 1 may select a first precoding matrix (also known as a codeword) $W_1$ from a first codebook. Precoder stage 2 may select a second precoding matrix $W_2$ from a second codebook—which is different from the first codebook—based on feedback aspect 2. The final precoding matrix (W) may be determined by multiplying the two codewords together (i.e., $W_1*W_2$).

The example provided in FIG. 4 may be extended to a precoder with more than two stages. Furthermore, for certain aspects, the final precoding matrix may equal $W_2*W_1$.

In MIMO systems, the CSI feedback is an integral component of precoder selection and channel quality indication, and the computations carried out by the base station or eNB 110 are facilitated if the codebook possesses certain properties such as constant modulus and/or finite alphabet. The constant modulus property means that all the matrix elements in a given precoding matrix are of equal absolute value. The finite alphabet property means that the matrix elements in the different coding matrices of a codebook are restricted to a simple finite alphabet, such as the 8-QPSK alphabet, in which each precoding matrix element is restricted to the set $\{\pm1, \pm j\}$. Specifically, the finite-alphabet property may greatly reduce the computational complexity associated with precoder computation, and the constant-modulus property has the benefit of increasing power amplifier (PA) utilization.

In the absence of codebook adaptation, the above list of desirable properties can be enforced by incorporating them as constraints in the codebook design. However, in adaptive or dual-stage codebook structures where the final precoder is a function of multiple feedback reports, care should be taken to make sure that the final precoder maintains these properties for any combination of feedback reports.

Figure 5:
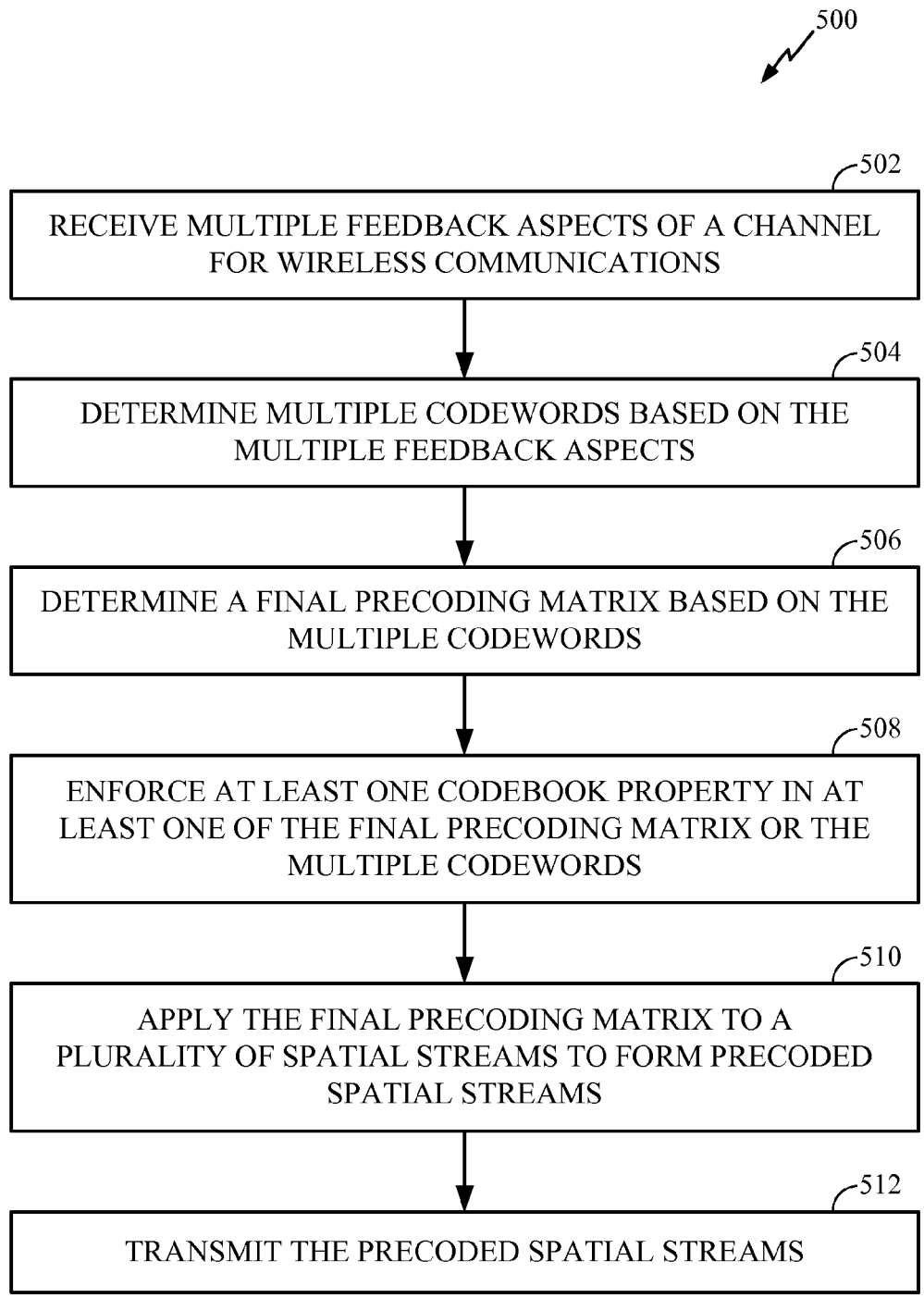
FIG. 5 illustrates example operations that may be performed at an evolved Node B (eNB) or user equipment (UE) to transmit precoded spatial streams, wherein at least one codebook property in at least one of a final precoding matrix or multiple codewords used to create the precoded spatial streams is enforced, in accordance with certain aspects of the present disclosure.

FIG. 5 illustrates example operations 500 that may be performed at an evolved Node B (eNB) or user equipment (UE) to transmit precoded spatial streams, wherein at least one codebook property in at least one of a final precoding matrix or multiple codewords used to create the precoded spatial streams is enforced, in accordance with certain aspects of the present disclosure. These operations 500 may be executed, for example, at the processor(s) 340, 330, and/or 338 of the eNB 110 or at the processor(s) 380, 366, and/or 358 of the UE 120 from FIG. 3. The operations 500 and other aspects of the present disclosure refer mainly to LTE-A systems, but are applicable to any other suitable MIMO system.

The operations 500 may begin, at 502, by receiving multiple feedback aspects of a channel for wireless communications. The multiple feedback aspects of the channel may comprise CSI. For certain aspects, one of the multiple feedback aspects may comprise a wideband property of the channel, while another one of the feedback aspects may comprise a subband-specific property of the channel.

At 504, multiple codewords may be determined based on the multiple feedback aspects. A final precoding matrix may be determined based on the multiple codewords at 506.

For certain aspects, the multiple codewords may comprise two codewords. In such aspects, determining the two codewords may comprise selecting the multiple codewords from a dual-stage codebook, and determining the final precoding matrix may comprise multiplying the two codewords together.

At 508, at least one codebook property may be enforced in the final precoding matrix and/or in at least one of the multiple codewords. For example, the at least one codebook property may comprise constant modulus and/or finite alphabet constraints. Techniques to enforce the codebook properties are described in greater detail below.

For certain aspects, determining the multiple codewords may comprise selecting each of the multiple codewords from one of different codebooks. Enforcing the at least one codebook property may comprise providing the different codebooks, wherein all of the multiple codewords in each of the codebooks meet the at least one codebook property.

At 510, the final precoding matrix may be applied to a plurality of spatial streams to form precoded spatial streams. The precoded spatial streams may be transmitted at 512, typically after further processing to apply OFDM, convert to the RF analog domain, and amplify the signals, among other things.

For certain aspects, constant modulus and finite-alphabet constraints may be enforced by requiring that the codewords of all individual precoding codebooks satisfy these properties. However, this approach does not easily lend itself to some design architectures, e.g., if the feedback consists of the channel correlation matrix derived empirically across a certain time/frequency window.

An alternative way of enforcing constant modulus and finite-alphabet properties is to quantize the individual feedback codewords appropriately such that both properties are met. The quantization itself may be carried out in multiple ways, e.g., by simply quantizing the individual components of the feedback matrices to the closest value in the alphabet. Alternatively, more sophisticated ways of performing quantization may be applied that minimize (or at least reduce) some distortion metric (or that maximize, or at least increase, some performance metric) across all elements of the feedback matrix or matrices. Another way of satisfying these properties is to apply quantization/normalization after the final precoder has been obtained from the individual feedback components.

In this manner, quantization may be used to enforce finite-alphabet and constant modulus properties in feedback structures consisting of multiple components, such as in precoders implementing adaptive and dual-stage codebooks. For certain aspects, quantization (and normalization) may either be applied to each of the individual feedback components or to the final precoding matrix. For certain aspects, quantization may be carried out independently on each individual component of the feedback matrices, while for other aspects, quantization may be applied in an effort to achieve a certain performance/distortion metric.

Therefore, for the operations 500 of FIG. 5, enforcing the at least one codebook property at 508 may comprise quantizing each of the multiple codewords for certain aspects. In such aspects, quantizing each of the multiple codewords may comprise quantizing each element in each of the multiple codewords to a nearest value in a finite alphabet and then normalizing each quantized element in each of the multiple codewords. Each of the multiple codewords may be quantized in an effort to increase a performance metric or decrease a distortion metric.

For other aspects, enforcing the at least one codebook property at 508 may comprise quantizing the final precoding matrix. In such aspects, quantizing the final precoding matrix may comprise quantizing each element in the final precoding matrix to a nearest value in a finite alphabet and then normalizing each quantized element in the final precoding matrix. The final precoding matrix may be quantized in an effort to increase a performance metric or decrease a distortion metric.

The transmitter and receiver may most likely apply the same rule for quantization (and normalization). In the absence of feedback decoding errors, the transmitter and receiver may most likely have the same interpretation of the feedback information.

UEs with higher complexity and computational capability may not need finite alphabet restriction. The quantization/normalization may be turned off based on UE-specific or cell-specific signaling or based on UE category.

Figure 5A:
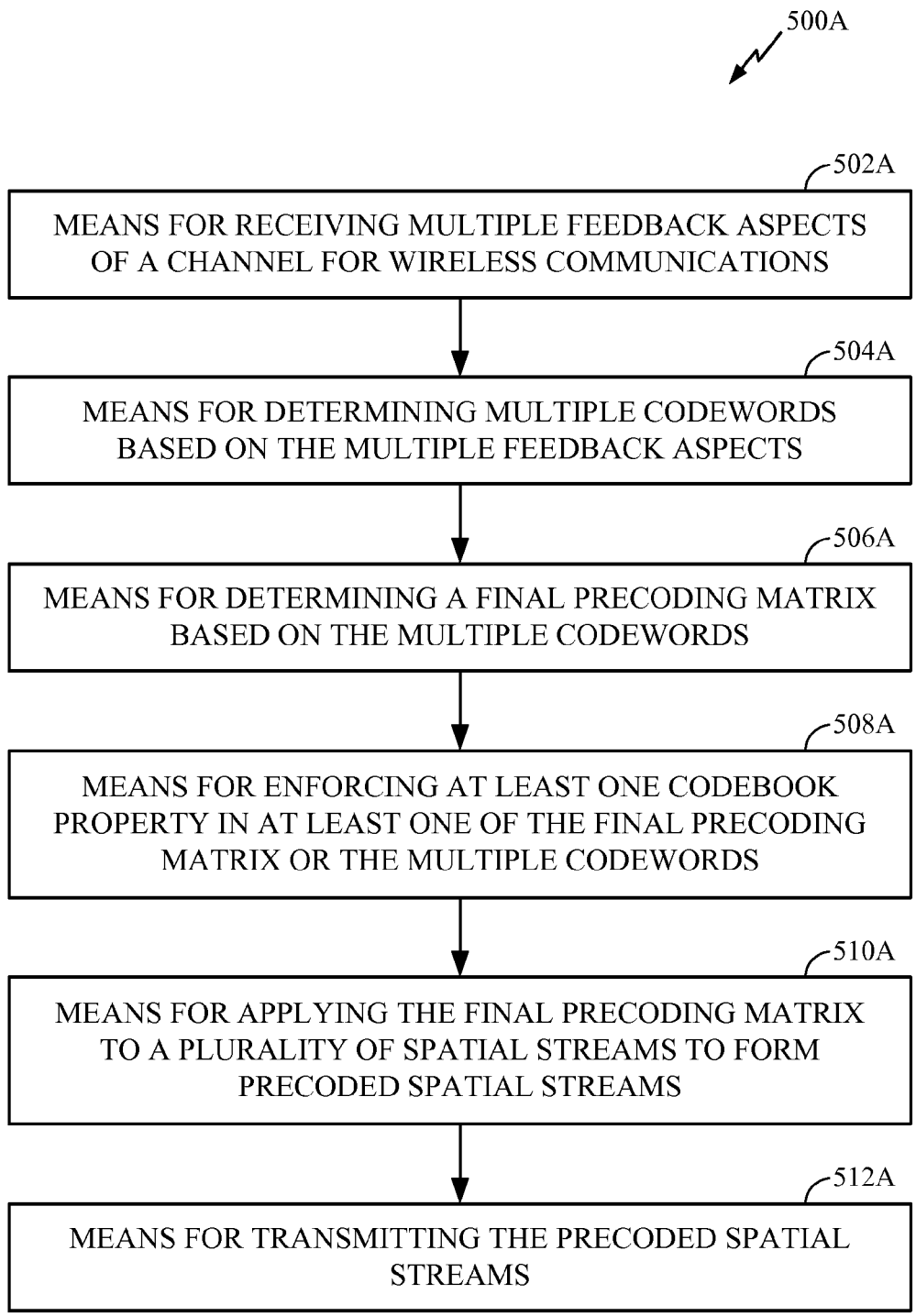
FIG. 5A illustrates example means capable of performing the operations shown in FIG. 5.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, operations 500 illustrated in FIG. 5 correspond to means 500A illustrated in FIG. 5A.

For example, means for transmitting or means for sending may comprise a transmitter, a modulator 354, and/or an antenna 352 of the UE 120 depicted in FIG. 3 or a transmitter, a modulator 332, and/or an antenna 334 of the eNB 110 shown in FIG. 3. Means for receiving may comprise a receiver, a demodulator 354, and/or an antenna 352 of the UE 120 depicted in FIG. 3 or a receiver, a demodulator 332, and/or an antenna 334 of the eNB 110 shown in FIG. 3. Means for processing, means for determining, means for enforcing, means for applying, and/or means for normalizing may comprise a processing system, which may include at least one processor, such as the transmit processor 320, the receive processor 338, or the controller/processor 340 of the eNB 110 or the receive processor 358, the transmit processor 364, or the controller/processor 380 of the UE 120 illustrated in FIG. 3.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and/or write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A method for wireless communications, comprising:
receiving multiple feedback aspects of a channel for the wireless communications;
determining multiple codewords based on the multiple feedback aspects;
determining a final precoding matrix based on the multiple codewords;
enforcing at least one codebook property in at least one of the final precoding matrix or the multiple codewords by at least one of:
providing multiple codebooks, wherein the determining the multiple codewords comprises selecting each of the multiple codewords from a different one of the multiple codebooks and wherein all of the multiple codewords in each of the codebooks meet the at least one codebook property;
quantizing each of the multiple codewords; or
quantizing the final precoding matrix;
applying the final precoding matrix to a plurality of spatial streams to form precoded spatial streams; and
transmitting the precoded spatial streams.

2. The method of claim 1, wherein the multiple codewords comprise two codewords.

3. The method of claim 2, wherein the determining the two codewords comprises selecting the multiple codewords from a dual-stage codebook.

4. The method of claim 3, wherein the determining the final precoding matrix comprises multiplying the two codewords together.

5. The method of claim 1, wherein the quantizing each of the multiple codewords comprises quantizing each element in each of the multiple codewords to a nearest value in a finite alphabet.

6. The method of claim 5, further comprising normalizing each quantized element in each of the multiple codewords.

7. The method of claim 1, wherein the quantizing each of the multiple codewords comprises quantizing each of the multiple codewords to increase a performance metric.

8. The method of claim 1, wherein the quantizing the final precoding matrix comprises quantizing each element in the final precoding matrix to a nearest value in a finite alphabet.

9. The method of claim 8, further comprising normalizing each quantized element in the final precoding matrix.

10. The method of claim 1, wherein the quantizing the final precoding matrix comprises quantizing the final precoding matrix to increase a performance metric.

11. The method of claim 1, wherein the at least one codebook property comprises a constant modulus.

12. The method of claim 1, wherein the at least one codebook property comprises a finite alphabet.

13. The method of claim 1, wherein the multiple feedback aspects of the channel comprise channel state information (CSI).

14. The method of claim 1, wherein one of the multiple feedback aspects of the channel comprises a wideband property of the channel.

15. The method of claim 14, wherein another one of the multiple feedback aspects of the channel comprises a sub-band-specific property of the channel.

16. An apparatus for wireless communications, comprising:
means for receiving multiple feedback aspects of a channel for the wireless communications;
means for determining multiple codewords based on the multiple feedback aspects;
means for determining a final precoding matrix based on the multiple codewords;
means for enforcing at least one codebook property in at least one of the final precoding matrix or the multiple codewords by at least one of:
providing multiple codebooks, wherein the determining the multiple codewords comprises selecting each of the multiple codewords from a different one of the multiple codebooks and wherein all of the multiple codewords in each of the codebooks meet the at least one codebook property;
quantizing each of the multiple codewords; or
quantizing the final precoding matrix;
means for applying the final precoding matrix to a plurality of spatial streams to form precoded spatial streams; and
means for transmitting the precoded spatial streams.

17. The apparatus of claim 16, wherein the multiple codewords comprise two codewords.

18. The apparatus of claim 17, wherein the means for determining the two codewords is configured to select the multiple codewords from a dual-stage codebook.

19. The apparatus of claim 18, wherein the means for determining the final precoding matrix is configured to multiply the two codewords together.

20. The apparatus of claim 16, wherein the means for enforcing the at least one codebook property is configured to quantize each of the multiple codewords by quantizing each element in each of the multiple codewords to a nearest value in a finite alphabet.

21. The apparatus of claim 20, further comprising means for normalizing each quantized element in each of the multiple codewords.

22. The apparatus of claim 16, wherein the means for enforcing the at least one codebook property is configured to quantize each of the multiple codewords by quantizing each of the multiple codewords to increase a performance metric.

23. The apparatus of claim 16, wherein the means for enforcing the at least one codebook property is configured to quantize the final precoding matrix by quantizing each element in the final precoding matrix to a nearest value in a finite alphabet.

24. The apparatus of claim 23, further comprising means for normalizing each quantized element in the final precoding matrix.

25. The apparatus of claim 16, wherein the means for enforcing the at least one codebook property is configured to quantize the final precoding matrix by quantizing the final precoding matrix to increase a performance metric.

26. The apparatus of claim 16, wherein the at least one codebook property comprises a constant modulus.

27. The apparatus of claim 16, wherein the at least one codebook property comprises a finite alphabet.

28. The apparatus of claim 16, wherein the multiple feedback aspects of the channel comprise channel state information (CSI).

29. The apparatus of claim 16, wherein one of the multiple feedback aspects of the channel comprises a wideband property of the channel.

30. The apparatus of claim 29, wherein another one of the multiple feedback aspects of the channel comprises a sub-band-specific property of the channel.

31. An apparatus for wireless communications, comprising:
a receiver configured to receive multiple feedback aspects of a channel for the wireless communications;
a processing system configured to:
determine multiple codewords based on the multiple feedback aspects;
determine a final precoding matrix based on the multiple codewords;
enforce at least one codebook property in at least one of the final precoding matrix or the multiple codewords by at least one of:
providing multiple codebooks, wherein the determining the multiple codewords comprises selecting each of the multiple codewords from a different one of the multiple codebooks and wherein all of the multiple codewords in each of the codebooks meet the at least one codebook property;
quantizing each of the multiple codewords; or
quantizing the final precoding matrix;
apply the final precoding matrix to a plurality of spatial streams to form precoded spatial streams; and
a transmitter configured to transmit the precoded spatial streams.

32. The apparatus of claim 31, wherein the multiple codewords comprise two codewords.

33. The apparatus of claim 32, wherein the processing system is configured to determine the two codewords by selecting the multiple codewords from a dual-stage codebook.

34. The apparatus of claim 33, wherein the processing system is configured to determine the final precoding matrix by multiplying the two codewords together.

35. The apparatus of claim 31, wherein the processing system is configured to quantize each of the multiple codewords by quantizing each element in each of the multiple codewords to a nearest value in a finite alphabet.

36. The apparatus of claim 35, wherein the processing system is configured to normalize each quantized element in each of the multiple codewords.

37. The apparatus of claim 31, wherein the processing system is configured to quantize each of the multiple codewords by quantizing each of the multiple codewords to increase a performance metric.

38. The apparatus of claim 31, wherein the processing system is configured to quantize the final precoding matrix by quantizing each element in the final precoding matrix to a nearest value in a finite alphabet.

39. The apparatus of claim 38, wherein the processing system is configured to normalize each quantized element in the final precoding matrix.

40. The apparatus of claim 31, wherein the processing system is configured to quantize the final precoding matrix by quantizing the final precoding matrix to increase a performance metric.

41. The apparatus of claim 31, wherein the at least one codebook property comprises a constant modulus.

42. The apparatus of claim 31, wherein the at least one codebook property comprises a finite alphabet.

43. The apparatus of claim 31, wherein the multiple feedback aspects of the channel comprise channel state information (CSI).

44. The apparatus of claim 31, wherein one of the multiple feedback aspects of the channel comprises a wideband property of the channel.

45. The apparatus of claim 44, wherein another one of the multiple feedback aspects of the channel comprises a sub-band-specific property of the channel.

46. A computer-program product for wireless communications, the computer-program product comprising:
a non-transitory computer-readable medium comprising code for:
receiving multiple feedback aspects of a channel for the wireless communications;
determining multiple codewords based on the multiple feedback aspects;
determining a final precoding matrix based on the multiple codewords;
enforcing at least one codebook property in at least one of the final precoding matrix or the multiple codewords by at least one of:
providing multiple codebooks, wherein the determining the multiple codewords comprises selecting each of the multiple codewords from a different one of the multiple codebooks and wherein all of the multiple codewords in each of the codebooks meet the at least one codebook property;
quantizing each of the multiple codewords; or
quantizing the final precoding matrix;
applying the final precoding matrix to a plurality of spatial streams to form precoded spatial streams; and
transmitting the precoded spatial streams.

47. The computer-program product of claim 46, wherein the multiple codewords comprise two codewords.

48. The computer-program product of claim 47, wherein the determining the two codewords comprises selecting the multiple codewords from a dual-stage codebook.

49. The computer-program product of claim 48, wherein the determining the final precoding matrix comprises multiplying the two codewords together.

50. The computer-program product of claim 46, wherein the quantizing each of the multiple codewords comprises quantizing each element in each of the multiple codewords to a nearest value in a finite alphabet.

51. The computer-program product of claim 50, further comprising code for normalizing each quantized element in each of the multiple codewords.

52. The computer-program product of claim 46, wherein the quantizing each of the multiple codewords comprises quantizing each of the multiple codewords to increase a performance metric.

53. The computer-program product of claim 46, wherein the quantizing the final precoding matrix comprises quantizing each element in the final precoding matrix to a nearest value in a finite alphabet.

54. The computer-program product of claim 46, further comprising code for normalizing each quantized element in the final precoding matrix.

55. The computer-program product of claim 46, wherein the quantizing the final precoding matrix comprises quantizing the final precoding matrix to increase a performance metric.

56. The computer-program product of claim 46, wherein the at least one codebook property comprises a constant modulus.

57. The computer-program product of claim 46, wherein the at least one codebook property comprises a finite alphabet.

58. The computer-program product of claim 46, wherein the multiple feedback aspects of the channel comprise channel state information (CSI).

59. The computer-program product of claim 46, wherein one of the multiple feedback aspects of the channel comprises a wideband property of the channel.

60. The computer-program product of claim 59, wherein another one of the multiple feedback aspects of the channel comprises a subband-specific property of the channel.

* * * * *